Figure 1:
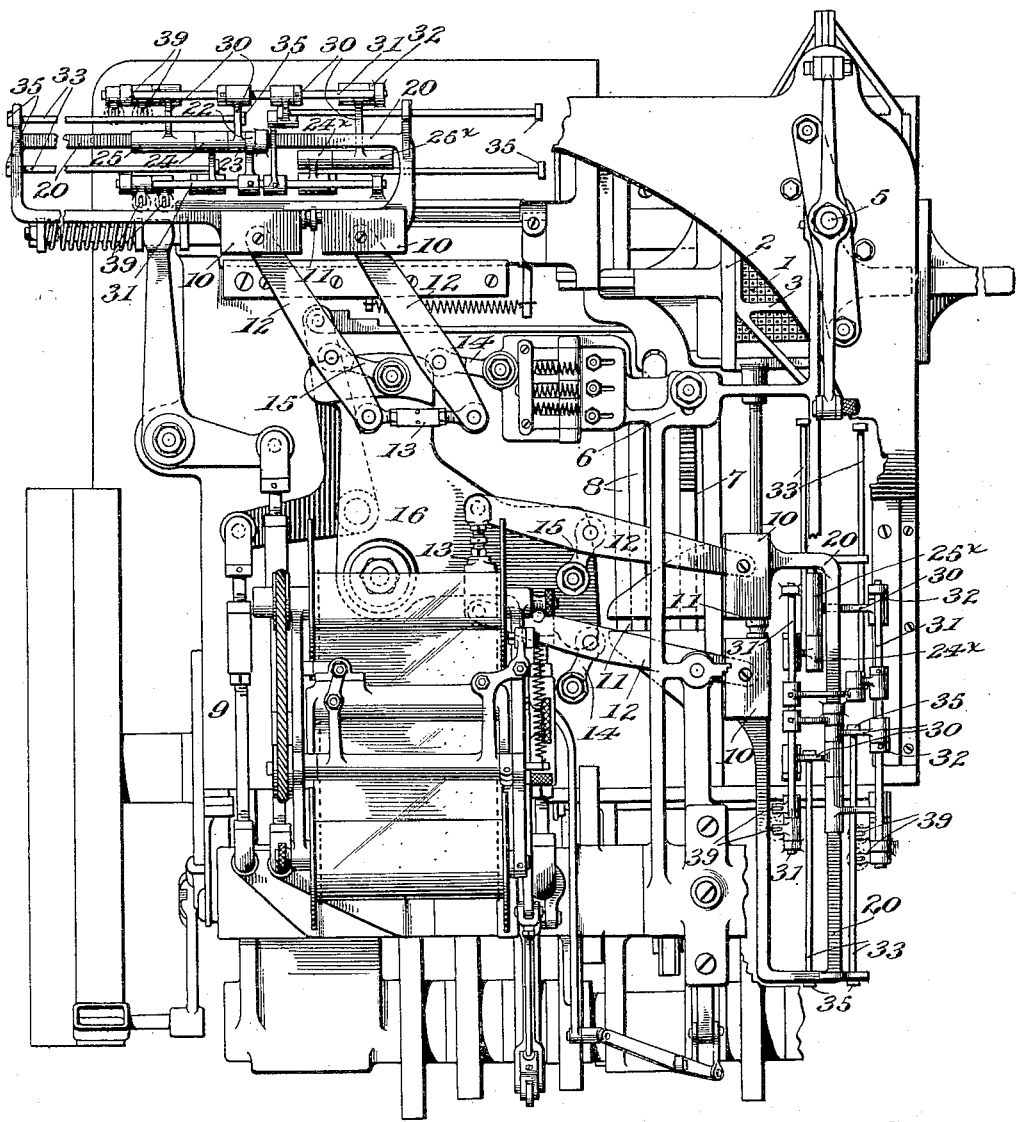

J. S. BANCROFT & M. C. INDAHL.
CENTERING MECHANISM FOR TYPE MACHINES.
APPLICATION FILED JULY 15, 1912.

1,094,624.

Patented Apr. 28, 1914.
6 SHEETS—SHEET 1.

Witnesses
Thomas Durant

Inventors
John S. Bancroft and
Mauritz C. Indahl
By Church & Church
their Attorneys

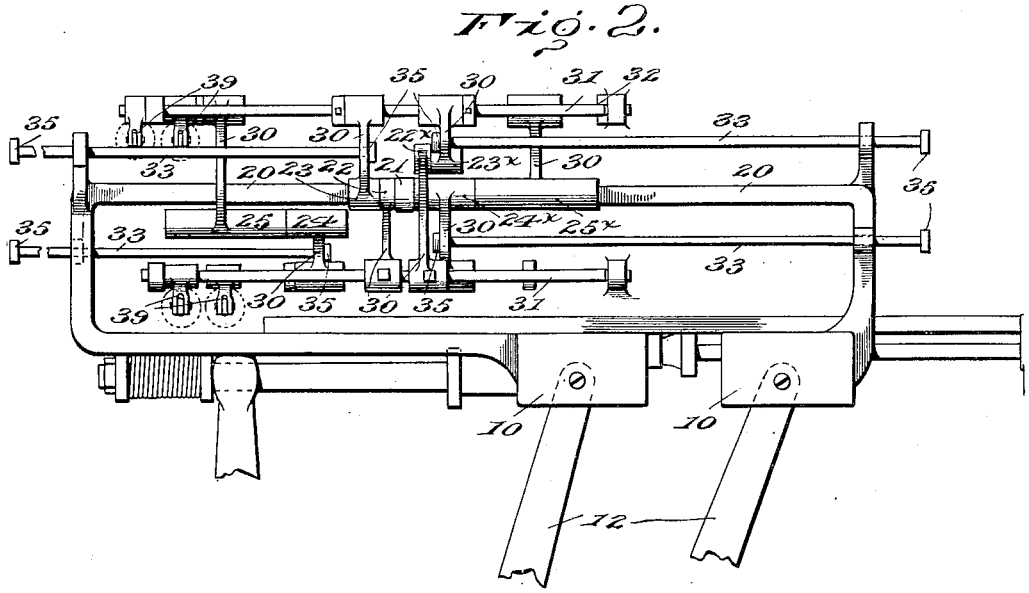
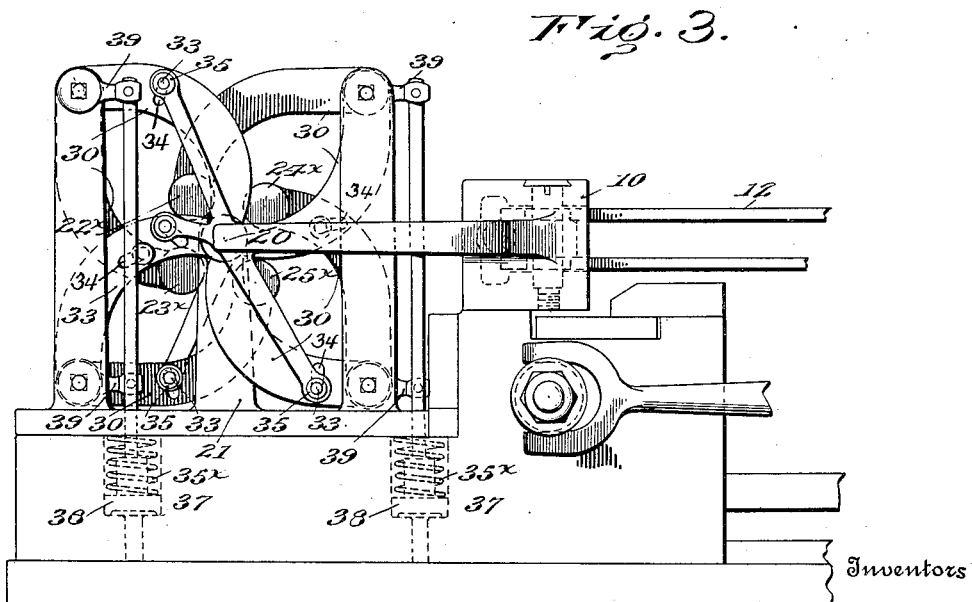

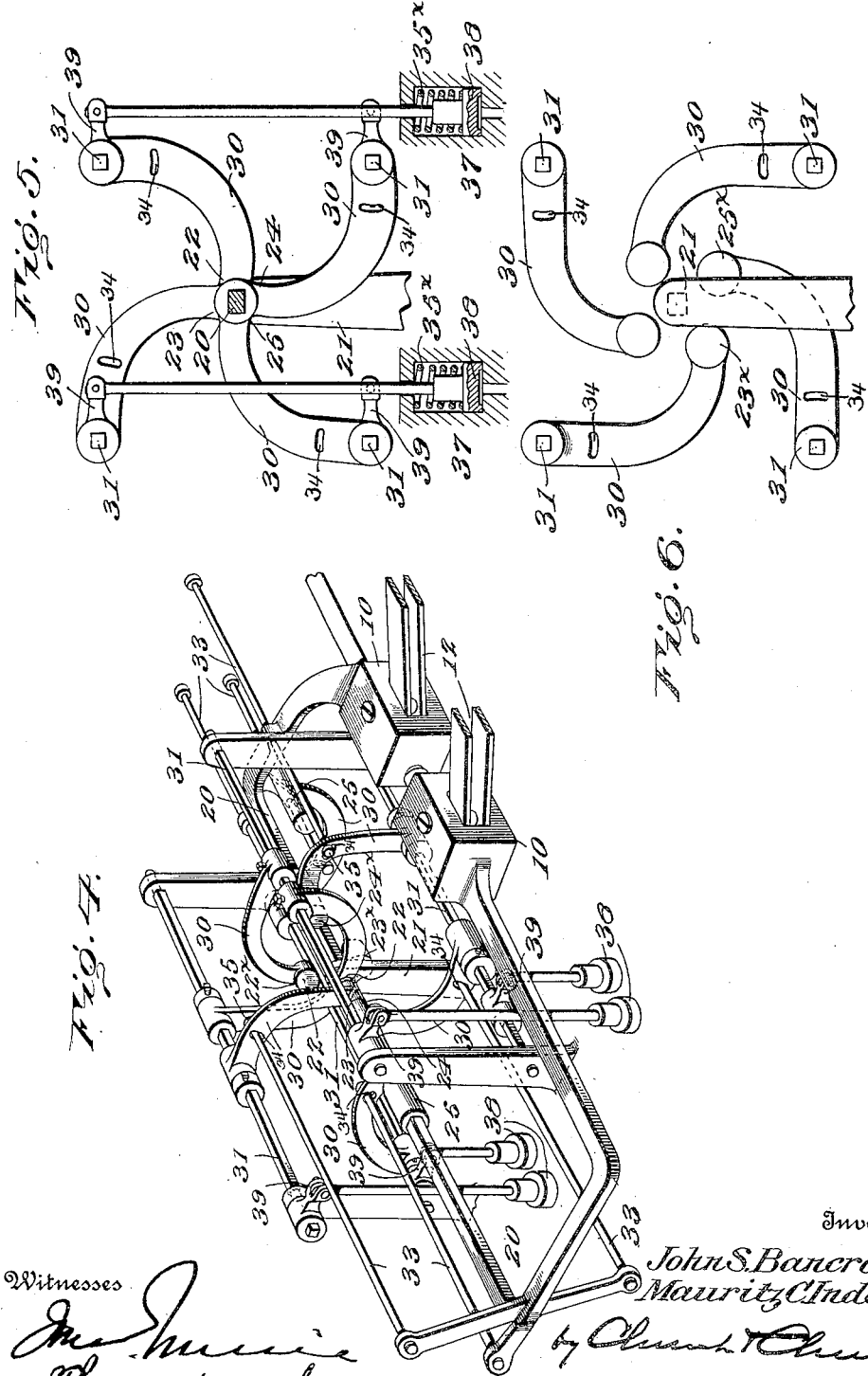

J. S. BANCROFT & M. C. INDAHL.
CENTERING MECHANISM FOR TYPE MACHINES.
APPLICATION FILED JULY 15, 1912.

1,094,624.

Patented Apr. 28, 1914.

6 SHEETS—SHEET 4.

Witnesses

Inventors
John S. Bancroft and
Mauritz C. Indahl
By Church & Church
their Attorneys J. S. BANCROFT & M. C. INDAHL.
CENTERING MECHANISM FOR TYPE MACHINES.
APPLICATION FILED JULY 15, 1912.
1,094,624.
Patented Apr. 28, 1914.
6 SHEETS—SHEET 5.
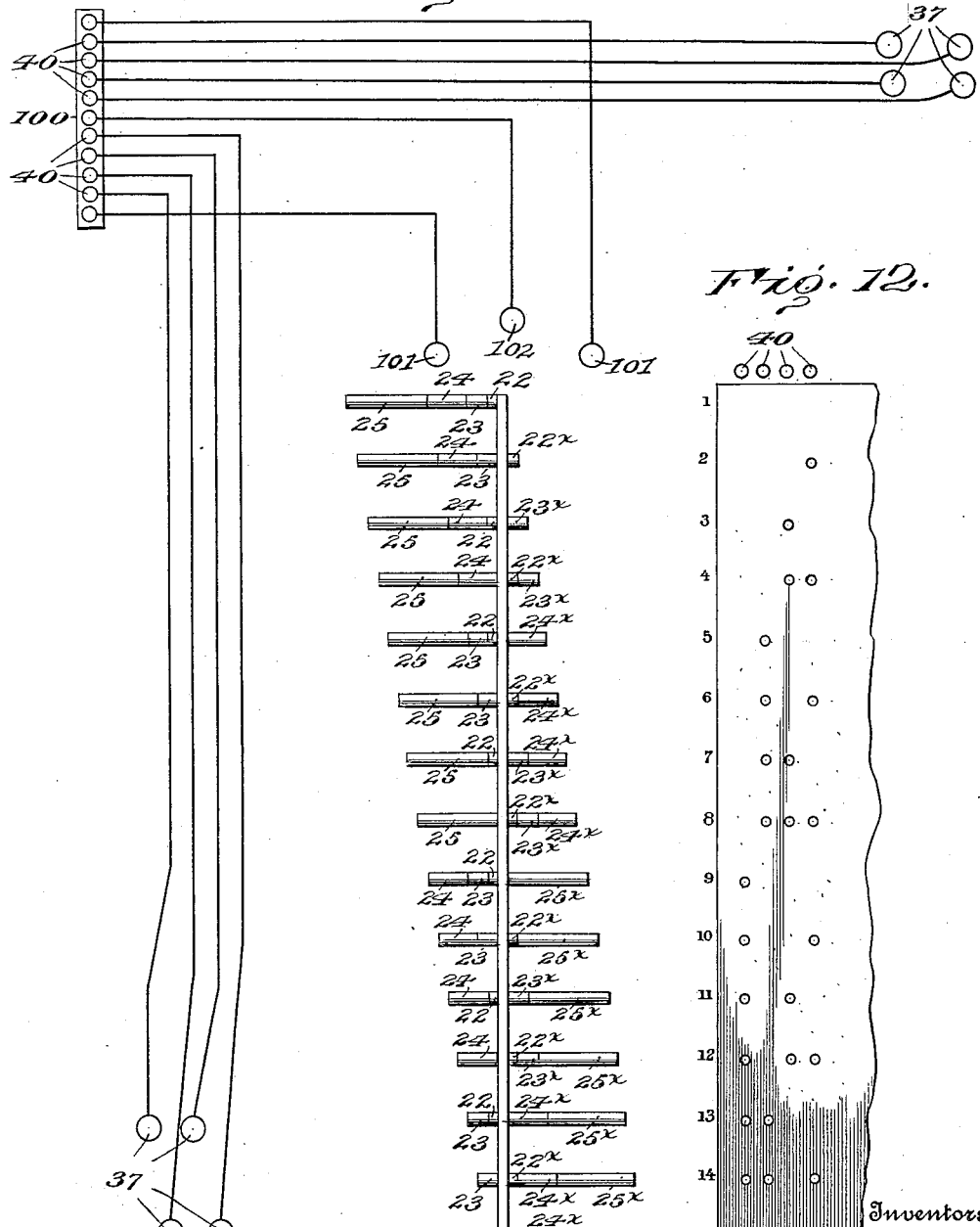

J. S. BANCROFT & M. C. INDAHL.
CENTERING MECHANISM FOR TYPE MACHINES.
APPLICATION FILED JULY 15, 1912.
1,094,624.
Patented Apr. 28, 1914.
6 SHEETS—SHEET 6.
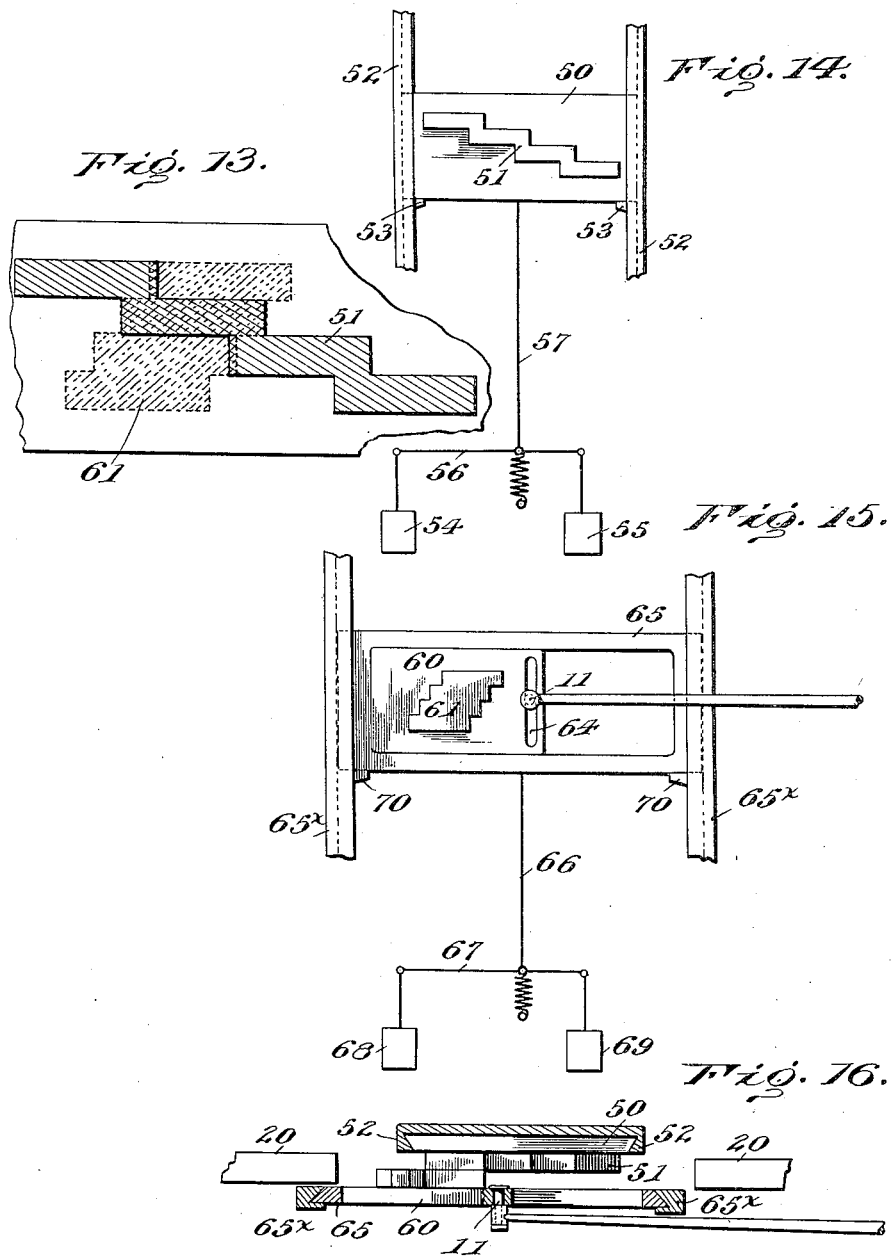

UNITED STATES PATENT OFFICE.

JOHN SELLERS BANCROFT AND MAURITZ C. INDAHL, OF PHILADELPHIA, PENNSYLVANIA, ASSIGNORS TO LANSTON MONOTYPE MACHINE COMPANY, OF PHILADELPHIA, PENNSYLVANIA, A CORPORATION OF VIRGINIA.

CENTERING MECHANISM FOR TYPE-MACHINES.

1,094,624.     Specification of Letters Patent.     Patented Apr. 28, 1914.

Application filed July 15, 1912. Serial No. 709,468.

*To all whom it may concern:*

Be it known that we, JOHN SELLERS BANCROFT and MAURITZ C. INDAHL, citizens of the United States, residing at Philadelphia, in the county of Philadelphia and State of Pennsylvania, have invented certain new and useful Improvements in Centering Mechanism for Type-Machines; and we do hereby declare the following to be a full, clear, and exact description of the same, reference being had to the accompanying drawings, forming part of this specification, and to the figures and letters of reference marked thereon.

The present invention relates to a new and improved centering or adjusting mechanism for type casting machines of the class illustrated in Patent No. 625,998, dated May 30, 1899, a distinguishing feature whereof is the direct movement of the performing members, such as the die case and mold adjusting devices, from one indicated position of adjustment to the next.

In the machine referred to duplex adjusting means are employed for determining and effecting movements of adjustment in a given direction, each of the same including a primary controller or fixed gage directly responsive to the signals of a record strip (represented by a plurality of separately movable stop pins serially arranged); a primary positioning or gaging mechanism responsive to said primary controller (represented by a pair of oppositely movable jaws whose closed position may be indicated by any pin of the primary controller); a secondary controller or shiftable gage responsive to said primary positioning mechanism or jaws (represented by a movable stop-bar interposed between and brought to position by the closing of the primary jaws); and a secondary positioning or gaging mechanism responsive to the secondary controller and acting upon the performing members to position the latter (represented by a second pair of oppositely movable jaws closing upon the stop bar and upon translating devices coupled with the die case or mold adjusting devices or both).

To effect rapid, positive and accurate movements of adjustment of the performing members, it is desirable that the jaws of the positioning mechanism acting thereon should positively engage and clamp between them both the controller and the translating devices coupled with said performing members, and were it not for its incapacity to deal with defective signals, the signal-responsive or primary controller of said patent might have been advantageously applied directly to said positioning mechanism. The defective signals referred to are such as effect a simultaneous movement or projection of two or more pins of the signal responsive controller, and may be produced by striking at one time two or more keys of the keyboard on which the record strip is produced, or by a vagrant perforation or perforations in the record strip occurring in operative relation to an otherwise correct signal. When such a defective signal is presented to the machine, two or more pins of the controller will be simultaneously projected, and if the jaws were arranged to close upon opposite sides of individual pins, to define the successive closed positions indicated by the serial arrangement of the latter, no closure could take place as each jaw would be arrested by the nearest pin, with the result that the jaws would remain open or distended to a greater or lesser extent, leaving the dependent member, or that which they are intended to position, at large and free to assume any position intermediate the jaws. It was this inability on the part of the signal-responsive controller to effectively deal with the situation thus presented that led to the adoption of two controllers and positioning mechanisms, wherein the positively acting positioning mechanism is employed in conjunction with the performing members, and a yielding positioning mechanism in connection with the signal-responsive controller, said last named positioning mechanism being so constructed and arranged that only one of its jaws contracts with the pins of the controller, hence is arrested by the first of the series of pins in case two or more are projected at the same time. The other jaw is then advanced, through yielding connections, into contact with the pin-arrested jaw and the dependent member or stop bar interposed between the two jaws is thus brought into position for the action of the jaws of the secondary positioning mechanism. The produced adjustment, although erroneous, is a normal one, in that it corresponds with the stage indicated by the pin nearest the engaging jaw, hence the dependent mechanism is brought into operative position and coördination with the other parts of the machine, so as to avoid interference and consequent damage.

Now the principal object of the present invention is to increase the speed capacity and accuracy of the machine as a whole by supplying it with a centering or adjusting mechanism wherein the signal-responsive controller operates directly upon the positioning mechanism for the performing members, instead of through an intermediate positioning mechanism and controller, as heretofore, and is at the same time immune to the disturbing or destructive influences of defective signals.

Figure 7:
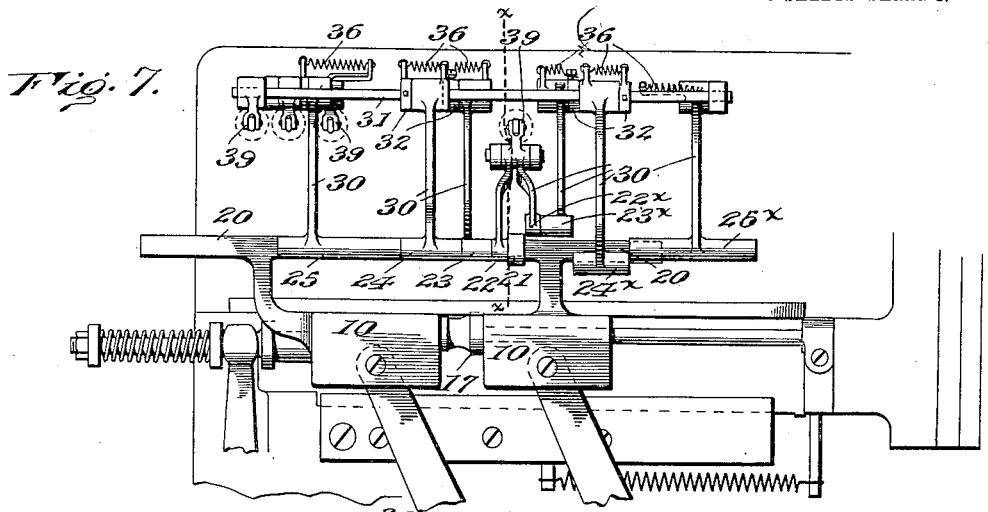
Figure 8:
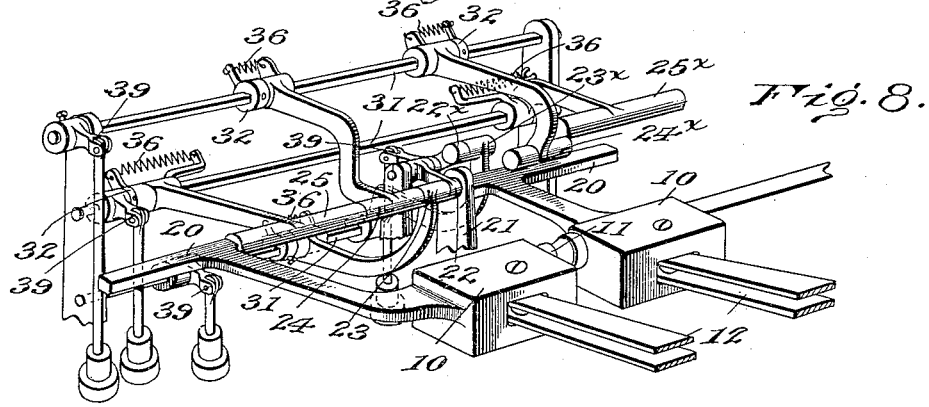
Figure 9:
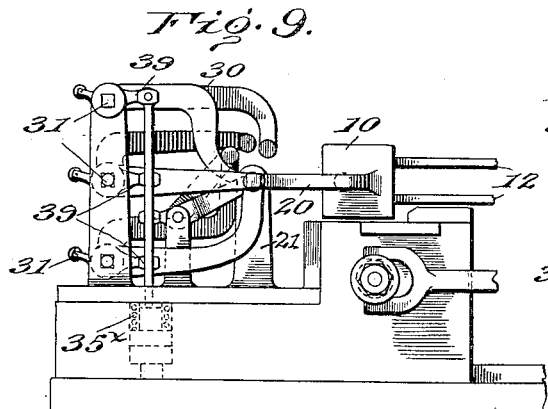
Figure 10:
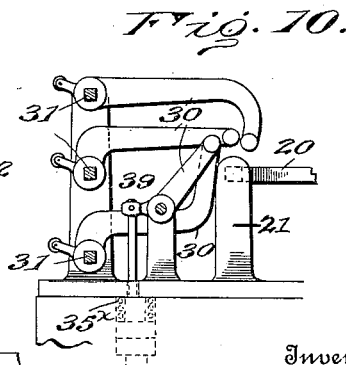

In the accompanying drawings illustrating preferred forms of embodiment of said invention, Figure 1 is a top plan view of a portion of a type casting machine with the improved centering mechanism applied thereto; Fig. 2 is a top plan view of the centering mechanism detached; Fig. 3 is an end view of the centering mechanism; Fig. 4 is a perspective of said mechanism; Fig. 5 is a transverse vertical section showing one set of gages in normal position; Fig. 6 is a similar view showing the complemental set of gages; Fig. 7 is a top plan view of a modified form of the centering mechanism; Fig. 8 is a perspective of the parts shown in Fig. 7; Fig. 9 is an end view of the mechanism shown in Fig. 7; Fig. 10 is a transverse vertical section on line $x$—$x$, Fig. 7; Fig. 11 is a diagrammatic view of the air connection; Fig. 12 is a diagrammatic view indicating successive portions of the station indicator and the signals corresponding therewith; Fig. 13 is a top plan view of a different type of station indicator embodying generic features. Fig. 14 is a side elevation of one section and Fig. 15 a similar view of the other section of the station indicator of Fig. 13. Fig. 16 is a diagrammatic view showing the two gaging sections overlapped in operative position.

The invention although of general application is illustrated in connection with the type casting machine of Patent No. 625,998 of May 30, 1899, wherein it is designed to supplant, in a great measure, the die or matrix centering mechanisms for positioning the die case and mold adjusting wedges.

It will suffice for present purposes to identify some of the principal elements of the casting machine, such as the die case 1, its carrier 2 and vertically movable support 3 whereby a two way movement of adjustment is permitted for bringing any one of the matrices in register with the mold (not shown); the centering pin or plunger 5 and its actuating lever 6 through which the selected matrix receives its final centering and is clamped upon the mold; the normal wedge 7 and two justifying wedges 8 for dimensioning the mold; and the paper feed mechanism 9 for intermittently advancing the record strip and rendering successive signals operative with relation to tracker bar 100. The metal injecting and galley mechanisms are not shown.

The function of the centering mechanism, so called, is to effect movements of adjustment of a dependent member directly from any one of a series of stations to any other station in response to indicating signals or perforations in the record strip. In the machine illustrated there are five such dependent members, to wit, the die case, its carrier and the three mold adjusting wedges, and duplicate centering mechanisms are employed, the one controlling the die case alone, and the other the die case carrier and the three wedges, although in some instances a third independent centering mechanism is applied to the wedges, as illustrated, for example, in Patent No. 770,253, dated September 20, 1904.

The centering mechanisms heretofore employed for the purpose embodied a primary gaging member comprising a plurality of stop pins serially arranged, each of said pins, save the terminal one, being under the direct control of a signal perforation in the record; a primary positioning mechanism; a secondary gaging member; and a secondary positioning mechanism. All of this mechanism has been displaced save the portion heretofore designated the secondary positioning mechanism (which now becomes the sole positioning mechanism), the same comprising two oppositely movable jaws 10 adapted to close upon an interposed portion 11 of the performing member or of the translating devices connected therewith. Each of said jaws is connected to one of two actuating levers 12, whose opposite ends are connected by a link 13. One of said levers is pivotally connected to the frame by a link 14 and the other is connected by a link 15 to the actuator 16, the arrangement being such that when said actuator is shifted to one extreme of its movement the jaws will be separated or opened to the maximum degree, and when moved to the opposite extreme the jaws will be brought into contact or closed upon the interposed member or members 11. Heretofore control over the closing position of the jaws was indirectly exercised by the signal-responsive primary gage acting through the primary positioning mechanism and secondary gaging member, the latter located between the jaws and provided with locking devices, and the position indicated by the signal during one cycle was translated into an adjustment during the next succeeding cycle.

According to the present invention the closed positions of the jaws is determined by a single signal-responsive station designator acting directly upon the jaws, and in which the signal-responsive members operate cumulatively to shift or change the station designator by an amount equal to the sum of the assigned values of the individual members at the time acted upon by the signals, so that in the event an incorrect signal is presented the performing member or members will be brought to an operative though erroneous position.

Two forms or types of station designators competent for the purpose are illustrated herein, the same being especially contrived to meet the requirements of the prior patented machine in that they each afford sixteen stages of adjustment, or one in excess of the number called for; but each is susceptible of enlargement or restriction by the addition or subtraction of similar elements.

Referring first to the form of embodiment illustrated in Figs. 1 to 6, inclusive. Between extensions 20 of the positioning jaws is located a fixed abutment or datum member 21, and on each side of the latter is ranged a series of gages, the members 22, 23, 24, 25, or 22$^x$, 23$^x$, 24$^x$, 25$^x$, whereof differ in linear measurement or value in the proportion of one, two, four and eight units, respectively; that is to say, gages 22, 22$^x$ are each one unit in value; gages 23, 23$^x$, two units; gages 24, 24$^x$, four units, and gages 25, 25$^x$, eight units, respectively. Corresponding gages of the two series are controlled by the same signal-responsive devices, and they are so arranged and connected that the withdrawal of the one at the time between the jaws will automatically effect the insertion of its counterpart on the opposite side of the abutment, thereby changing the position of the station indicator or interponent as many units as are represented by the shifted gages without, however, altering its dimensions, which latter remain the same and equals the interval between the proximate faces of extensions 20, when the jaws are closed upon the translating devices. The normal or initial position of the station indicator or that assumed when the signal-responsive devices are not in action may be indicated by the interponent formed by the abutment and any four gages of different values, and in the example given, where the action of the primary gage of the prior machine is followed, the normal position of said interponent is at one end of the series and is indicated by gages 22, 23, 24, 25, disposed in tandem with abutment 21 so that when the signal-responsive devices are not active one of the jaws in closing will encounter and be positively arrested by the abutment and the other jaw will in like manner engage and be arrested by the gage 25 most remote from the abutment. This adjustment corresponds with that produced by the stationary pin of the primary gage in the prior machine, which pin is brought into action only in the absence of a centering signal perforation. To advance the position of the station indicator or interponent to correspond with any desired number of units up to fifteen it is only necessary to withdraw one or more of the gages 22, 23, 24, 25, from one side and insert the corresponding gages 22$^x$, 23$^x$, 24$^x$, 25$^x$, of the companion series on the opposite side of the abutment 21. Thus, as indicated in Fig. 12, a one unit displacement is effected by the withdrawal of 22 and insertion of 22$^x$; a two unit displacement by withdrawing 23 and inserting 23$^x$; a three unit displacement by withdrawing 22 and 23 and inserting 23$^x$ and 24; a seven unit displacement by withdrawing 24 and inserting 24$^x$; a five unit displacement by withdrawing 22 and 24 and inserting 22$^x$ and 24$^x$; a six unit displacement by withdrawing 23 and 24 and inserting 23$^x$ and 244; a seven unit displacement by withdrawing 22, 23 and 24 and inserting 22$^x$, 23$^x$ and 24$^x$; an eight unit displacement by withdrawing 25 and inserting 25$^x$; a nine unit displacement by withdrawing 22 and 25 and inserting 22$^x$ and 25$^x$; a ten unit displacement by withdrawing 23 and 25 and inserting 23$^x$ and 25$^x$; an eleven unit displacement by withdrawing 22, 23 and 25, and inserting 22$^x$, 23$^x$, and 25$^x$; a twelve unit displacement by withdrawing 24 and 25 and inserting 24$^x$ and 25$^x$; a thirteen unit displacement by withdrawing 22, 24 and 25 and inserting 22$^x$, 24$^x$ and 25$^x$; a fourteen unit displacement by withdrawing 23, 24 and 25, and inserting 23$^x$, 24$^x$ and 25$^x$; and a fifteen unit displacement by withdrawing 22, 23, 24 and 25, and inserting 22$^x$, 23$^x$, 24$^x$ and 25$^x$. It will thus be seen that the actuation of any one or more of the signal responsive devices will effect movements of the gages whereby the space value represented by the actuated gage or gages is transferred from one side of the datum line to the other thus maintaining the station indicator of uniform linear extent but at different locations in the line of movement of the jaws. In other words a movement affecting a shifting of any one or more of the gages will result in locating the closing position of the jaws at one of the established stations, the two sets of gages operating, in effect, as plus and minus elements of the station indicator, inasmuch as the withdrawal of any gage of one set creates a deficiency on one side of the common datum line, which deficiency is supplied by a gage of the same value on the other side of said datum line, with the result that the linear dimensions of the station indicator remain unchanged while its position in relation to the fixed datum line is varied or shifted to one side or the other in the line of movement of the jaws by an amount equal to the value of the substituted gage or gages.

When the jaws close on the station indicator the operative members or gages of the two series are compacted against the datum member to establish the indicated station, to accomplish which, and at the same time permit said gages to be restored to operative position after each engagement, the following arrangement has been devised. Each gage is attached to one of a series of arms 30 so shaped and disposed as to permit the gages of adjacent arms to pass one another, and the arms of associated gages 22 and $22^x$, 23 and $23^x$, 24 and $24^x$, 25 and $25^x$, are connected in pairs to one of four shafts 31 mounted in bearings on the frame. With the possible exception of gages 22 and $22^x$, which require but slight if any longitudinal movement, the arms of each pair of associated gages are free to move longitudinally of their respective shafts, but are compelled to partake of the rotary movement thereof, as by employing shafts of angular section and bearings on the arms with corresponding openings. The shafts are provided with adjustable collars 32 against which the adjacent arm is normally held to position the gages so that one may pass the other in its movement toward and from the jaws.

In the principal embodiment illustrated in Figs. 1 to 6 inclusive, the four shafts 31 are disposed about the engaging extensions of the jaws, and in the modification, Figs. 7 to 10 inclusive, they are all located on the same side thereof, an arrangement favoring reduction in the length of the jaw extension 20. The return of the gages longitudinally to normal position may be effected by rods 33 carried by the jaws and each extending through a slot 34 in one of the arms 30 and provided with heads 35 as in Figs. 1 to 6 inclusive; or springs 36 may be interposed between the arms 30 and collars 32 for this purpose, as illustrated in Figs. 7 and 8. In either event upon the opening of the jaws the gages will be shifted to normal position by the action of heads 35 drawing them against the collars 32 or by the springs 36 performing the like office. As before stated gages 22, 23, 24, and 25, normally stand in tandem between the left hand jaw, (Figs. 1, 4 and 5) and abutment 21 and are so held by gravity or equivalent means such as springs $35^x$, while the gages $22^x$, $23^x$, $24^x$, and $25^x$, are suspended in like order outside of the path of the jaws. Each shaft 31 is provided with a signal-responsive actuating device represented by a motor 37 whose piston 38 is coupled with an arm 39 on the shaft of the associated gages controlled thereby, the arrangement being such that the pistons are held normally at one end of the cylinders by springs $35^x$ and when pressure is admitted to any one or more of the motors the piston will be forced to the opposite extreme of the cylinder and corresponding gages 22, 23, 24, 25 will be displaced and their associated gages $22^x$, $23^x$, $24^x$, $25^x$, interposed on the opposite side of the fixed abutment. The opposite ends of the cylinders serve in this instance as stops for determining the positions of the gages. Each motor 37 is connected to a separate port 40, Fig. 11, in the tracker bar 100 of the paper feed mechanism, and is actuated whenever a perforation in the record strip is brought into register with said port. The eight ports and motors thus provided are competent to perform all the functions of the twenty-eight ports and motors controlling the two centering mechanisms of the prior patented machine, thereby correspondingly reducing cost of construction and the width of the record strip or controller. In either case the two ports controlling the justification wedge transfer piston 101 and the justification space transfer piston 102, Fig. 11, are retained and operate as before.

The designating signals for the new centering mechanism differ from those of the prior patented machine in this that in the latter a single perforation indicates, by its position, that one of the series of stations to which the performing element is to be adjusted, whereas, according to the present invention, the several stations are indicated both by the number and position of the perforations. For example, the terminal station is indicated, as heretofore, by the absence of centering perforations; the next station by a single perforation registering with the motor of gages 22, $22^x$; the third station by a perforation registering with the motor gages 23, $23^x$; the fourth station by perforations registering with the motors of gages 22, $22^x$ and 23, $23^x$; the fifth station by a single perforation registering with the motor of gages 24, $24^x$; the sixth station by perforations registering with the motors of gages 22, $22^x$ and 24, $24^x$, and so on, the number of perforations and their locations corresponding with the gages to be moved for indicating the number of units of displacement required to bring the performing member or members to the designated station.

In Fig. 12 there is shown, diagrammatically, the series of signals representing successive stations or stages of adjustment and in parallel therewith the gages actively responding thereto, from which it will be seen that a unitary displacement of the station designator is effected by each successive signal.

It is apparent that in its broadest aspect the present invention is not limited to the special form of embodiment thus far described, but comprehends as well other and different forms and varieties of signal-responsive station indicating mechanism adapted for direct action in connection with the oppositely movable positioning jaws, and possessing the capacity of registering and indicating the cumulative as well as the separate values of individual signals, and in Figs. 13 to 16 inclusive, is shown, by way of illustration, a different type of station indicator possessing these characteristics and which may readily be substituted for the variety hereinbefore described. In this example the various stations are indicated and established by an interponent composed of two movable members each controlled by two signal-responsive devices adapted for separate or conjoint action for determining the different positions of the performing member. One of said movable members or sections is represented by a stepped series of gages 51, the latter projecting between the positioning jaws, and mounted upon a plate 50 arranged to reciprocate transversely of the path of the jaws in or on guides 52 secured to the main frame. The several gages 51 are of equal linear dimensions and successive gages are displaced one from another in a uniform degree longitudinally of the path of the jaws. In the present instance the steps in the series measure four units each. The length of each step coincides with the interval between the engaging portions of the positioning jaws when closed so that by shifting the gage plate 50 to bring one or the other of the gages 51 into the path of the jaws the closing position of the latter will be varied to correspond with the location of the gage at the time in position. Thus if the first of the series of gages 51 is interposed between the jaws the latter will close at the point determined by the position of said gage in the line of movement of said jaws; if the second gage 51 is thus interposed, the jaws will close at a point four units distant from the first station; if the third gage is interposed the closing point of the jaws will be eight units distant from the first station; and if the last or fourth gage is interposed the station indicated will be twelve units removed from the first station. In effecting these adjustments the guide for the gage plate 50 constitutes, in effect, the datum line from which the several stages of adjustment as effected by the stepped gages are computed, the first gage representing zero or first position in the series. The positioning of the gage plate 50 to bring its several gages individually in register with the jaws is effected and controlled through the agency of a fixed stop 53 two pistons 54, 55, a lever 56, and a link 57. The fixed stop 53 serves to define one extreme position of plate 50, for example that in which the first of the series of stepped gages 51 lies between and in line with the positioning jaws. This may be regarded as the normal position and is maintained by gravity, spring pressure or other yielding means. Pistons 54, 55, are connected, respectively, to opposite ends of lever 56, and at a point between said pistons one third distant from piston 55 said lever is coupled through link 57 with the gage plate. The strokes of the two pistons are the same, and the arrangement is such that when piston 54 is advanced its full stroke plate 50 will be moved to withdraw the first and locate the second gage between the jaws; when piston 55 advances its full stroke the gage plate will be advanced to bring the third of the series of gages into action; and when both pistons are advanced, the gage plate will be shifted to bring the fourth of the series of gages into position to receive the jaws. Thus through the medium of the stop and the two pistons 54, 55, each of which latter responds to a separate signal perforation in the record strip, the gage plate 50 can be established in either of the four positions required to present one or the other of its gages 51 between the jaws, to determine the closed position of the latter at successive stations located four units apart. Situated likewise between the positioning jaws in juxtaposition to gage plate 50 and in parallel therewith is the other member of the interponent in the form of a second gage plate 60 equipped with a series of stepped gages 61, all of the same linear dimensions as the gages 51, but displaced successively one unit, that is one fourth the displacement of successive gages 51. Gage plate 60 is coupled with the performing member or translating devices by having the engaging portion 11 thereof inserted in a guide or slot 64 in said gage plate, and the latter is supported to reciprocate longitudinally of the path of the jaws in guides in a carrier 65. Carrier 65 is in turn mounted in guides 65* on the frame to reciprocate transversely of the jaws in parallel with plate 50, whereby gage plate 60 may be shifted to bring any one of its gages 61 between and in alinement with the jaws and at the same time is free to follow the movements of said jaws in either direction.

The adjustments of carrier 65 and of the contained gage plate 60 are or may be performed in the same way as the adjustments of gage plate 50; that is to say, through the medium of link 66, lever 67, and pistons 68, 69, these parts being so proportioned and arranged that when no signal perforation is presented carrier 65 resting against stop 70 will maintain the first of the series of gages 61 between the jaws; an advance movement of piston 68 will shift carrier 65 to present the second gage; a corresponding movement of piston 69 will present the third gage; and the advance of both pistons will present the fourth of the series of gages 61.

Like the one first described this station indicator possesses a capacity for designating sixteen successive positions and is under the control of four signal-responsive devices, represented by pistons 54, 55, 68 and 69.

It is to be understood that the adjustments of gage plates 50, 60, are made while the jaws are separated and that the gage plates are maintained in said adjusted position during the closing movement of jaws and until after the performing devices are engaged; and, further, that in the absence of a perforation or perforations in the record strip registering with one or more of the pistons 54, 55, 68, 69, the gage plates 50, 60, will be maintained in position to present the first of each series of gages 51, 61, between and in alinement with the jaws. If the jaws are closed with the gages in this position they will be arrested by gage 51 in a predetermined relation to the datum line and at the same time in so closing the jaws will bring gage 61 into register with said gage 51 thereby establishing a definite relation between the performing member and said closed position of the jaws. The position thus established is the first of the series herein provided for and corresponds with that of the fixed pin of the primary gage in the prior patented machines, and is attained when the record strip contains no signal perforation registering with the signal responsive devices 54, 55, 68, 69. The second stage in the series of positions for the performing member is indicated and determined by a signal perforation in the record strip registering with piston 68 and operating to shift plate 60 to present the second of the series of stepped gages 61 between the jaws. As this step is displaced one unit from the first, the closing of the jaws upon said first gage 51 will have the effect of displacing plate 60 and the connected performing member one unit distant from the station attained when said first gage 61 was employed. In like manner the third of the series of positions for the performing member is indicated and attained by a signal perforation registering with piston 69 which effects the presentation in position of the third gage 61, whereby plate 60 and the connected performing member will be moved by the jaws until said third gage 61 coincides in position with the engaged first gage 51, or two units removed from the first station; and the fourth of the series of positions is indicated and attained by a signal perforation registering with both pistons 68, 69, whereby plate 60 is shifted to present the fourth gage 61, and, the latter being brought by the jaws into coincidence with the first of the series of gages 51, a three unit shift in the position of plate 60 and the connected performing member will result. The fifth of the series of positions is indicated and attained by a signal perforation registering with piston 54, whereby plate 50 is advanced to present the second of its series of gages 51. As this second gage 51 is displaced four units with respect to the first of the same series, the closing of the jaws upon said second gage 51 in conjunction with the first gage 61 will cause a four unit displacement of the performing member or a shift to the fifth of the series of stations. A signal perforation registering with piston 54 in association with one registering with piston 68 whereby the second gages of both series 51, 61, are presented in conjunction will effect an additional displacement of one unit and locate the performing member in the sixth position. It will be seen that each successive advance of gage plate 61 adds one unit and each successive advance of gage plate 50 adds four units, consequently the seventh station is indicated by perforations registering with pistons 54, 69; the eighth by perforations registering with 54, 68 and 69; the ninth by a perforation registering with 55; the tenth by perforations registering with 55, 68; the eleventh by perforations registering with 55, 69; the twelfth by perforations registering with 55, 68, 69; the thirteenth by perforations registering with 54, 55; the fourteenth by perforations registering with 54, 55, 68; the fifteenth by perforations registering with 54, 55, 69; and the sixteenth by perforations registering with 54, 55, 68, 69. It is evident, therefore, that any possible combination of perforations controlling selecting pistons 54, 55, 68, 69, will bring the performing member to one or the other of the sixteen established stations and in harmony with the associated performing members of the machine in the event the first fifteen are utilized whether said perforation or perforations is or are intentionally or accidentally present in the positioning signal.

In operation each signal is presented and pressure applied to the record strip while the jaws are fully distended, whereupon the gages corresponding with or controlled by the perforation or perforations are actuated to adjust the interponent to correspond therewith. Pressure is maintained on the selected gages during the closing of the jaws, which latter are positively arrested in closed position at the designated station and, in consequence, the performing member is brought positively to position and there held until engaged by other retaining means. Pressure is then withdrawn from the gages, and the jaws are opened, thereby permitting or compelling the return of the gages to their normal or initial positions ready for the action of the next positioning signal. It is obvious the normal position of rest of the station indicator, that is to say, the position assumed by the interponent when the signal responsive devices are inactive (there being no signal perforation presented) may be located at any one of the series of stations, and unitary stages of adjustment be computed in either or both directions therefrom. The illustrated arrangements have been adopted merely as a matter of adaptation, to harmonize with the general scheme of the prior machine wherein the normal is located at one extreme of the series of indicated stations.

Having thus described our invention, what we claim is:

1. A positioning or centering mechanism for the performing members of a type casting machine, including, in combination, oppositely movable positioning jaws and a signal-responsive station indicator acting directly upon said jaws to selectively determine different adjustments of the performing member.

2. A positioning or centering mechanism such as described, including, in combination, the following elements, to wit; oppositely movable positioning jaws, a translating device for the performing member, and a signal-responsive station indicator interposed between and acted upon by said jaws to position the performing member.

3. A positioning or centering mechanism such as described, including, in combination, oppositely movable positioning jaws and a signal-responsive station indicator interposed between and acted upon by both jaws.

4. A positioning or centering mechanism including, in combination, the following elements, to wit: oppositely movable positioning jaws; translating devices for a performing member interposed between and engaged by said jaws; and a direct acting signal-responsive station indicator also interposed between and engaged by said jaws to determine various positions of adjustment of the performing member.

5. A positioning or centering mechanism such as described, including, in combination, the following elements, to wit; oppositely movable positioning jaws; a signal-responsive station indicator provided with a plurality of gages arranged for interposition between said jaws, and a plurality of signal responsive devices controlling said gages to shift the position without changing the linear dimensions of the interponent between the jaws.

6. A positioning or centering mechanism such as described, including, in combination, a pair of oppositely movable positioning jaws and a station indicator therefor comprising an interponent formed by a plurality of gages of different dimensions arranged for interposition between said jaws, and a plurality of signal responsive actuating devices for said gages operating individually or collectively to effect an interchange of gages whereby the position of the interponent is shifted without change in its linear dimensions.

7. In a positioning or centering mechanism such as described, provided with oppositely movable positioning jaws and in combination therewith, a direct acting signal responsive station indicator, the same including an interponent located between the jaws and composed of members of two series of gages acting in conjunction to shift its position in the line of travel of the jaws without varying the linear dimension of said interponent, and a plurality of signal responsive actuating devices representing different values and operating to shift the gages to correspond with the sum of the values of the signal responsive devices at the time acting.

8. A positioning or centering mechanism such as described, including, in combination, oppositely movable positioning jaws and a direct acting station indicator for said jaws provided with a plurality of signal responsive controlling means representing different values and less in number than the stations indicated thereby.

9. In a positioning or centering mechanism such as described, provided with oppositely movable positioning jaws and in combination therewith, a station indicator provided with a sectional interponent against which both jaws operate.

10. In a positioning or centering mechanism such as described, provided with oppositely movable positioning jaws, and in combination therewith, a station indicator provided with two series of gages associated together to form a sectional interponent for the jaws, and a plurality of signal responsive devices operating singly or conjointly upon said series of gages, to adjust the interponent and thereby indicate that one of the series of stations corresponding with the sum of the values of the signal-responsive devices at the time in action.

11. A positioning or centering mechanism such as described, provided with oppositely movable positioning jaws, and in combination therewith, a station indicator provided with a sectional interponent composed of two series of gages and signal responsive means acting singly and in multiple to vary the relative positions of the two series of gages, to indicate different positions of adjustment.

12. In a positioning or centering mechanism, such as described, provided with oppositely movable positioning jaws, and in combination therewith, a signal responsive station indicator provided with a sectional interponent composed of members of two graded series of gages whereof gages of like value in both series are coupled in pairs for alternate interposition between the jaws, and separate signal responsive devices each coupled with one pair of said gages to withdraw the one from the path of the jaws and insert the other therein, whereby the interponent is displaced by addition on one side and subtraction on the other in an amount equal to the space value of the shifted gages.

13. In a positioning or centering mechanism such as described, provided with oppositely movable positioning jaws and in combination therewith, a signal-responsive station indicator for determining successive closed positions of said jaws, the same including two correspondingly graded series of gages, the members whereof are coupled in pairs of the same value for dissimultaneous presentation between the jaws, a fixed abutment intermediate the two series of gages and projecting into the path of the jaws, intermediate the latter, and means for shifting each pair of gages to withdraw one from the path of the jaws and insert the other therein.

14. A centering or adjusting mechanism for the performing members of type casting machines, the same including, in combination, two oppositely movable positioning jaws, and an interposed signal-responsive station indicator, the latter comprising a datum member and two corresponding series of gages ranged on opposite sides of said datum member, the gages of like value of the two series being coupled together for interposition between the jaws and datum member on alternately opposite sides of the latter.

15. A centering or adjusting mechanism for the performing members of type casting machines, the same including, in combination, two oppositely movable positioning jaws and a signal-responsive station indicator composed of a plurality of gages, the members whereof are drawn from two graduated series disposed on opposite sides of a datum member, the gages of the same value in the two series being coupled for alternate interposition between the jaws on opposite sides of the datum member, so that the withdrawal of a gage from between the jaws on one side the datum member will be accompanied by the insertion of a gage of the same value on the opposite side of said datum member for shifting the position without changing the dimensions of the interposed station indicator.

16. A centering or adjusting mechanism such as described, including, in combination, a pair of oppositely movable positioning jaws and a signal-responsive station indicator, the latter comprising a fixed abutment and two graduated sets or series of gages ranged on opposite sides of said abutment and having like gages of both sets coupled for simultaneous movement to bring the one into and the other out of line with said abutment on relatively opposite sides thereof, and a plurality of signal responsive devices, one for each connected pair of gages.

JOHN SELLERS BANCROFT.
MAURITZ C. INDAHL.

Witnesses:
FRANK H. MASSEY,
MAURICE R. MASSEY.

Copies of this patent may be obtained for five cents each, by addressing the "Commissioner of Patents, Washington, D. C."